United States Patent Office 3,758,472
Patented Sept. 11, 1973

3,758,472
PREPARATION OF 2-ALKOXY-4-HYDROXYPYRIMIDINES
Roy Dennis Bowden, Runcorn, England, assignor to Imperial Chemical Industries Limited, London, England
No Drawing. Filed Dec. 9, 1970, Ser. No. 96,578
Claims priority, application Great Britain, Dec. 10, 1969, 60,324/69
Int. Cl. C07d 51/38
U.S. Cl. 260—251 R      4 Claims

ABSTRACT OF THE DISCLOSURE

2 - alkoxy - 4 - hydroxypyrimidines (useful as intermediates in the production of 2-alkylamino - 4 - hydroxypyrimidines) are obtained by interaction of O - alkyl isoureas and 2-substituted-aminoalk-1-ene-1-carboxylates in the presence of a base.

---

This invention relates to pyrimidine derivatives, and more particularly to a process for the preparation of 2-alkoxy-4-hydroxypyrimidines and salts thereof.

According to the present invention there is provided a process for the preparation of 2-alkoxy-4-hydroxy-4-pyrimidines, or salts thereof, of the formula:

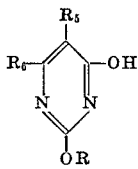

which comprises the step of reacting an O-alkyl isourea

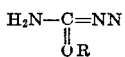

in the presence of a base with a crotonic ester

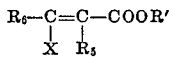

wherein R, R', $R_5$ and $R_6$, which may be the same or different, are each an alkyl group containing from 1 to 8 carbon atoms, and X is an N-radical derived from an amine R''R''' NH wherein R'' and R''' which may be the same or different, are alkyl, aryl or aralkyl groups or an N-radical derived from a cyclic secondary amine. Thus, for example, the said 2 - alkoxy - 4 - hydroxypyrimidines may be prepared by interacting an O-alkyl isourea, for example O-methyl isourea, with a 3-(1-pyrrolidinyl)-crotonic ester, especially an ethyl ester, for example 3-(1-pyrrolidinyl) - 2 - n - butyl-crotonate. The said 3-(1-pyrrolidinyl)-crotonic esters may in turn be prepared by reacting pyrrolidine with the appropriate beta-keto ester. Instead of pyrrolidine other cyclic amines such as morpholine or piperidine may be used. In the case of alkylamines of the formula R''R'''NH wherein R'' and/or R''' are alkyl groups the alkyl groups preferably contain up to 4 carbon atoms.

The reaction is conveniently carried out using the O-alkyl isourea, for example O-methyl or O-ethyl isourea, in the form of a salt, for example the hydrochloride, although other salts such as the sulphate or p-toluene sulphonate may also be used.

A wide range of inorganic and organic bases may be used in the reaction, for example an alkali-metal hydroxide, carbonate or acetate, an organic amine or a quaternary ammonium hydroxide. The use of an alkali-metal carbonate or alkoxide is especially preferred. Thus the reaction may be carried out by interacting a solution of the O-alkyl isourea in an alkanol (for example methanol) and the crotonic ester in the presence of sodium or potassium in an alkanol (for example methanol). Preferably an excess of the O-alkyl isourea is used. The reaction is preferably carried out at ambient temperature over a period of 10–30 hours (for example 20 hours), followed by heating under reflux. The free 2-alkoxy - 4 - hydroxypyrimidine may be liberated by acidification of the salt so formed. A wide range of salts may be prepared using the appropriate base in the above reaction, or for example by neutralisation of the free 2-alkoxy-4-hydroxy-pyrimidine or by double decomposition.

The said 2-alkoxy - 4 - hydroxypyrimidines or their salts may be converted, for example, into the corresponding 2-alkylamino - 4 - hydroxypyrimidines or salts or ethers thereof by heating with an alkylamine in acetic acid. The 2-alkylamino - 4 - hydroxy - 5,6 - dialkylpyrimidines (and the salts and ethers thereof) may be used as active ingredients in fungicidal composition.

The method described herein is especially applicable in the preparation of the said 2-alkoxy - 4 - hydroxypyrimidines wherein R, $R_5$ and $R_6$ (which may be the same or different) are alkyl groups containing from 1 to 4 carbon atoms, for example 2-methoxy-4-hydroxy-5-n-butyl - 6 - methylpyrimidine (and salts thereof). These alkoxy derivatives may then be converted, for example, into alkylamino derivatives of the formula

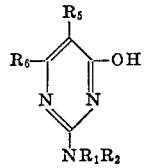

wherein $R_1$ is hydrogen or an alkyl group containing from 1 to 4 carbon atoms, $R_2$ is an alkyl group containing from 1 to 4 carbon atoms and $R_5$ and $R_6$ are as defined above (for example 2-dimethyl-amino - 4 - hydroxy-5-n-butyl-6-methylpyrimidine and 2-ethylamino-4-hydroxy-5-n-butyl-6-methylpyrimidine), for example by heating with an amine of the formula $NHR_1R_2$ in acetic acid.

The invention is illustrated but not limited by the following example.

EXAMPLE (i) Preparation of ethyl-3-(1-pyrrolidinyl)-2-n-butyl-crotonate

A mixture of ethyl-n-butyl acetoacetate (186 g.), pyrrolidine (100 ml.), p-toluene sulphonic acid (100 mg.) and benzene (500 ml.) was heated under Dean and Stark conditions for 6 hours. The benzene was removed by evaporation and the residue distilled under reduced pressure to give ethyl - 3-(1-pyrrolidinyl)-2-n-butylcrotonate (boiling point 120–122° C./0.8 mm. Hg) in 50% yield (based on the beta keto ester).

The product was characterised by the following spectral data:
I.R. $\nu_{max}$ (liquid film): 2900, 1730, 1670, 1550, 1250, 1240, 1210, 1170, 1130 and 1100$^{-1}$.

M.S. $\frac{M}{e}$ 289, 1891; $C_{14}H_{25}NO_2$ has 239.1885

(ii) Preparation of 2-methoxy-4-hydroxy-5-n-butyl-6-methylpyrimidine

O-methyl isourea hydrochloride (33 g.) and ethyl 3-(1-pyrrolidinyl)-2-n-butylcrotonate (48 g.) were added to a suspension of potassium carbonate (69 g.) in dry methanol (250 ml.). The mixture was heated under reflux for 3 hours. It was then cooled, poured into water (1 litre) and acidified to a pH of 6 by addition of 50% hydrochloric acid. The precipitate was filtered, washed with water and dried to give 2-methoxy-4-hydroxy-5-n-butyl-6-methylpyrimidine (melting point 154–156° C.) in 30% yield (based on pyrrolidinyl crotonate).

What I claim is:

1. A process for the preparation of 2-alkoxy-4-hydroxypyrimidines of the formula:

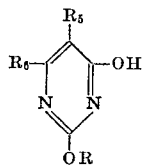

which comprises the step of reacting an O-alkyl isourea

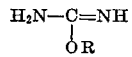

in the presence of a base selected from alkalimetal, carbonates, and methoxides with a crotonic ester

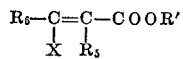

wherein R, R', $R_5$ and $R_6$, which may be the same or different are each alkyl containing from 1 to 8 carbon atoms, and X is an N-radical derived from an amine R'' R''' NH wherein R'' and R''', which may be the same or different, are alkyl of up to 4 carbon atoms or an N-radical derived from pyrrolidine, morpholine or piperidine.

2. A process as claimed in claim 1 wherein R is a methyl or ethyl group.

3. A process as claimed in claim 1 wherein $R_5$ and $R_6$ each contain from 1 to 4 carbon atoms.

4. A process as claimed in claim 1 which is carried out in solution in methanol.

References Cited
UNITED STATES PATENTS
3,037,977   6/1962   Maisack et al ..... 260—239.75

DONALD G. DAUS, Primary Examiner
R. V. RUSH, Assistant Examiner

U.S. Cl. X.R.
260—256.4 N; 424—251